United States Patent Office 2,731,337
Patented Jan. 17, 1956

2,731,337

HERBICIDAL COMPOSITION COMPRISING 3-(P-CHLOROPHENYL)-1,1-DIMETHYL-UREA

Henry L. Morrill, Clayton, and Ferdinand B. Zienty, Brentwood, Mo., assignors to Monsanto Chemical Company, St. Louis, Mo., a corporation of Delaware No Drawing. Application November 26, 1951, Serial No. 258,292

18 Claims. (Cl. 71—2.4)

This invention relates to free-flowing herbicidal compositions comprising 3-(p-chlorophenyl)-1,1-dimethylurea, to the preparation thereof, and to the usage thereof in the control of noxious vegetation.

3-(p-chlorophenyl)-1,1-dimethylurea,

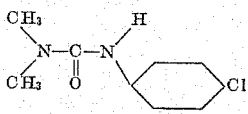

a white crystalline solid melting at about 175° C., has been found to be useful in the control of noxious vegetation. Various methods of formulating this herbicidal agent with solid absorbent materials therefor, commonly called "carriers," have been tried in order to produce free-flowing compositions. However, for one or more reasons not one has been found entirely satisfactory. For example, when 3-(p-chlorophenyl)-1,1-dimethylurea is incorporated either in a solid carrier followed by a tumbling operation or as a part of a grinding operation in a pebble mill for reducing the component parts to the appropriate particle size, the operations have been found to be expensive and time consuming and produce a non-uniform product containing a large amount of fines. Such 3-(p-chlorophenyl)-1,1-dimethylurea containing formulations are objectionable, not only in view of their lack of uniformity but, also, in that when the dry formulation is applied, e. g., by a manually or automatically operated duster, these finely divided particles or fines float in the air and via air currents are apt to come in contact with and injure or destroy valuable vegetation. These finely divided particles or fines are objectionable not only in view of the aforesaid, but also because they represent a waste of material.

It is an object of this invention to provide free-flowing substantially uniform compositions containing 3-(p-chlorophenyl)-1,1-dimethylurea. It is also an object of this invention to provide a practical, convenient, efficient and relatively inexpensive method for preparing free-flowing compositions containing 3-(p-chlorophenyl)-1,1-dimethylurea. It is a further object to provide improved free-flowing compositions containing 3-(p-chlorophenyl)-1,1-dimethylurea. Further objects will become apparent hereinafter.

The foregoing and other objects of this invention are accomplished by admixing a liquid composite comprising 3-(p-chlorophenyl)-1,1-dimethylurea and a hydroxy substituted aromatic compound, wherein the liquid composite has a freezing point or liquefying point below that of 3-(p-chlorophenyl)-1,1-dimethylurea, with a solid absorbent carrier. The resultant product is a dry free-flowing highly effective herbicidal composition embodying an optimum distribution of 3-(p-chlorophenyl)-1,1-dimethylurea, which product is further characterized by good storage properties.

In the preparation of the new free-flowing herbicidal compositions any hydroxy substituted aromatic compound may be employed provided it forms a composite having a liquefying point below that of 3-(p-chlorophenyl)-1,1-dimethylurea, and provided it, i. e. the hydroxy substituted aromatic compound, functions as an inert solvent in the formation of the liquid composition. It is preferred that a highly concentrated solution of 3-(p-chlorophenyl)-1,1-dimethylurea be prepared for admixing with the solid absorbent carrier. Among the inert hydroxy substituted aromatic compounds which can be employed in the process of this invention are phenol, o-, m-, and p-cresols, cresylic acid, o-, m-, and p-ethylphenols, the dimethylphenols, the diethylphenols, thymol, carvacrol, o-, m-, and p-chlorophenols, o-, m-, and p-bromophenols, the monochlorosubstituted cresols, mono-chlorocresylic acid, 2,4-dichlorophenol, 2,4,6-trichlorophenol, 2,3,4,6-tetrachlorophenol, pentachlorophenol, 2,4,6-tribromophenol, o-, m-, and p-nitrophenols, 2,4-dinitrophenol, 5-chloro-2-nitrophenol, 4-chloro-2-nitrophenol, 2-chloro-4-nitrophenol, 1- and 2-naphthol, and the like, and mixtures thereof. The hydroxy substituted aromatic compounds having melting points below about 100° C. are preferred. In certain instances the presence of small amounts of water, e. g. 1 to 5 parts water per 100 parts 3-(p-chlorophenyl)-1,1-dimethylurea, has been found advantageous in the preparation of the improved herbicidal composition. The amount of water tolerated is determined by its extent of miscibility in the liquid composite.

The solid absorbent materials employed in the preparation of the new free-flowing herbicidal compositions may be herbicidally active or inert. Exemplary of such are pyrophyllite, fuller's earth, kieselguhr, diatomaceous earth, talc, volcanic sand, pumice, chalk, wood flour, nutshell flour, charcoal, inorganic phosphates, aluminum silicate, magnesium carbonate and like solid materials. The preferred carriers are granular porous materials, such as volcanic sand and pumice, having a particle size of about 0.5 to 5 millimeters.

In carrying out the process of this invention either crude or pure 3-(p-chlorophenyl)-1,1-dimethylurea may be employed. The preferred process is to dissolve the substituted urea in a suitable hydroxy substituted aromatic compound at a temperature wherein the latter is in a liquid state and thereby form a homogeneous liquid composite. The solution or liquid composite so formed is then incorporated in a solid absorbent carrier while maintaining the temperature of the carrier at least that at which the hydroxy substituted aromatic compound remains in a liquid state and retains 3-(p-chlorophenyl)-1,1-dimethylurea in solution but below the melting point of 3-(p-chlorophenyl)-1,1-dimethylurea. However, in the broader aspects of this invention it is to be understood that variations of the aforesaid can be employed. For example, the substituted urea and the hydroxy substituted aromatic compound, if it be a solid at room temperature, may be first mechanically mixed and then heated to a temperature wherein a homogeneous solution forms and then the liquid composite so formed incorporated in a solid absorbent carrier while maintaining the temperature of the carrier as aforementioned. Another method is to mix mechanically the solid absorbent carrier, 3-(p-chlorophenyl)-1,1-dimethylurea, and the hydroxy substituted aromatic compound, and while agitating, heat the mixture to a temperature above the liquefying point of the composite comprising a hydroxy substituted aromatic compound and 3-(p-chlorophenyl)-1,1-dimethylurea.

As illustrative of this invention the following is given:

Example I

Substantially 11.1 parts by weight of phenol is heated to about 90° C. and thereto is added and intimately mixed substantially 11.1 parts by weight of 3-(p-chlorophenyl)-1,1-dimethylurea. The solution or liquid composite so formed is added to a suitable mixing vessel containing substantially 200 parts by weight of fuller's earth (1–20 microns) while rotating said vessel and maintaining the temperature at about 85–95° C. Upon completion of the liquid composite addition, the vessel is rotated for about 5 minutes while maintaining the temperature at about 85–95° C., and then cooled. The resultant product is free-flowing, substantially dustless, containing approximately 5% by weight of 3-(p-chlorophenyl)-1,1-dimethylurea uniformly dispersed therein.

Example II

Substantially 25 parts by weight of o-cresol is heated to about 100° C. and thereto is added substantially 25 parts by weight of 3-(p-chlorophenyl)-1,1-dimethylurea. The solution or liquid composite so formed is added to a suitable mixing vessel containing substantially 200 parts by weight of talc (1–7 microns) while rotating said vessel and maintaining the temperature at about 95–100° C. Upon completion of the liquid composite addition the vessel is rotated for about 5 minutes while maintaining the temperature at about 95–100° C. and then cooled. The resultant product is free-flowing, substantially dustless, containing approximately 10% by weight of 3-(p-chlorophenyl)-1,1-dimethylurea uniformly dispersed therein.

Example III

Substantially 11.1 parts by weight of p-chlorophenol is heated to about 70° C. and thereto is added substantially 11.1 parts by weight of 3-(p-chlorophenyl)-1,1-dimethylurea. The solution or liquid composite so formed is added to a suitable mixing vessel containing substantially 200 parts by weight of volcanic sand (0.5–2 millimeters) while rotating said vessel and maintaining the temperature at about 70–75° C. Upon completion of the liquid composite addition the vessel is rotated for about 5 minutes while maintaining the temperature at about 70–75° C. and then cooled. The resultant product is free-flowing, substantially dustless, and composed of discrete particles containing approximately 5% by weight of 3-(p-chlorophenyl)-1,1-dimethylurea uniformly dispersed therein.

Employing the same weights of materials, but replacing p-chlorophenol with o-chlorophenol and using a temperature range of 85–90° C. instead of 70–75° C., a free-flowing, substantially dustless product composed of discrete particles containing approximately 5% by weight 3-(p-chlorophenyl)-1,1-dimethylurea uniformly dispersed therein is obtained.

Example IV

Substantially 15 parts by weight of phenol admixed with 1 part by weight water is heated to about 90° C. and thereto is added substantially 20 parts by weight of 3-(p-chlorophenyl)-1,1-dimethylurea. The solution or liquid composite so formed is added to a suitable mixing vessel containing substantially 164 parts by weight of volcanic sand (0.5–2 millimeters) while rotating said vessel and maintaining the temperature at about 85–95° C. Upon completion of the liquid composite addition the vessel is rotated for about 5 minutes while maintaining the temperature at about 85–95° C. and then cooled. The resultant product is free-flowing, substantially dustless, and composed of discrete particles containing approximately 10% by weight of 3-(p-chlorophenyl)-1,1-dimethylurea uniformly dispersed therein.

Example V

Substantially 15 parts by weight of a petroleum cresylic acid admixed with 1 part by weight of water is heated to about 100° C. and thereto is added substantially 20 parts by weight of 3-(p-chlorophenyl)-1,1-dimethylurea. The solution or liquid composite so formed is added to a suitable mixing vessel containing substantially 364 parts by weight of volcanic sand (1–4 millimeters) while rotating said vessel and maintaining the temperature of the overall mix at about 95–105° C. Upon completion of the solution addition the vessel is rotated for about 5 minutes while maintaining the temperature at about 95–105° C. and then cooled. The resultant product is free-flowing, substantially dustless, and composed of discrete particles containing approximately 5% by weight of 3-(p-chlorophenyl)-1,1-dimethylurea uniformly dispersed therein.

Example VI

Substantially 11.1 parts by weight of pentachlorophenol is intimately mixed with substantially 11.1 parts by weight of 3-(p-chlorophenyl)-1,1-dimethylurea and the mix heated to about 145° C. The solution or liquid composite so formed is added to a suitable mixing vessel containing substantially 200 parts by weight of fuller's earth (1–20 microns) while rotating said vessel and maintaining the temperature at about 140–145° C. Upon completion of the liquid composite addition the vessel is rotated for about 5 minutes while maintaining the temperature at about 140–145° C. and then cooled. The resultant product is free-flowing, substantially dustless, containing approximately 5% by weight of 3-(p-chlorophenyl)-1,1-dimethylurea uniformly dispersed therein.

3-(p-chlorophenyl)-1,1-dimethylurea may be admixed with any hydroxy substituted aromatic compound provided it is an inert solvent therefor and provided the composite has a liquefying point below that of said substituted urea. However, as aforenoted, the preferred hydroxy substituted aromatic compound adjuvants are those having melting points below about 100° C. Employing the preferred hydroxy substituted aromatic compounds, the mixing operation with the solid carrier is conveniently carried out in general at about 60 to 100° C. Although higher temperatures make possible the utilization of liquid composites having higher concentrations of 3-(p-chlorophenyl)-1,1-dimethylurea, higher operating costs also result. In that the process of this invention is particularly concerned with the manufacture of concentrated herbidical compositions, the quantity of active ingredient may be any suitable herbicidal quantity and the total amount of active ingredient and hydroxy substituted aromatic compound in the liquid composite will ordinarily be maintained at the maximum consistent with the absorptivity of the carrier to produce a dry free-flowing herbicidal composition.

What is claimed is:

1. In a process for preparing free-flowing herbicidal compositions containing 3-(p-chlorophenyl)-1,1-dimethylurea and a solid absorbent carrier, the step comprising intimately mixing 3-(p-chlorophenyl)-1,1-dimethylurea, a mono-hydroxy substituted aromatic compound, and a solid absorbent carrier, in proportions to give a dry product, the temperature of mixing being below the melting point of 3-(p-chlorophenyl)-1,1-dimethylurea, the proportion of 3-(p-chlorophenyl)-1,1-dimethylurea in respect to the mono-hydroxy substituted aromatic compound being such as to produce a homogeneous liquid composite having a freezing point below that of 3-(p-chlorophenyl)-1,1-dimethylurea, the hydroxy substituent of said mono-hydroxy aromatic compound being attached directly to the aromatic nucleus.

2. In a process for preparing free-flowing herbicidal compositions containing 3-(p-chlorophenyl)-1,1-dimethylurea as the essential active ingredient and a solid absorbent carrier, the step comprising intimately mixing a liquid composite comprising 3-(p-chlorophenyl)-1,1-dimethylurea and a mono-hydroxy substituted aromatic compound having a melting point of below about 100° C., with a solid absorbent carrier, in proportions to give a dry product, the temperature of mixing being below the melting point of 3-(p-chlorophenyl)-1,1-dimethylurea, the hydroxy substituent of said mono-hydroxy aromatic compound being attached directly to the aromatic nucleus.

3. In a process for preparing free-flowing herbicidal compositions containing 3-(p-chlorophenyl)-1,1-dimethylurea as the essential active ingredient and a solid absorbent carrier, the step comprising intimately mixing a liquid composite comprising 3-(p-chlorophenyl)-1,1-dimethylurea and cresylic acid with a solid absorbent carrier, in proportions to give a dry product, the temperature of mixing being below the melting point of 3-(p-chlorophenyl)-1,1-dimethylurea.

4. In a process for preparing free-flowing herbicidal compositions containing 3-(p-chlorophenyl)-1,1-dimethylurea as the essential active ingredient and a solid absorbent carrier, the step comprising intimately mixing a liquid composite comprising 3-(p-chlorophenyl)-1,1-dimethylurea and a mono-hydroxy substituted aromatic compound having a melting point of below about 100° C., in proportions to give a dry product, with a solid absorbent carrier, the temperature of mixing being about 60 to 100° C., the hydroxy substituent of said mono-hydroxy aromatic compound being attached directly to the aromatic nucleus.

5. In a process for preparing free-flowing herbicidal compositions containing 3-(p-chlorophenyl)-1,1-dimethylurea as the essential active ingredient and a solid absorbent carrier, the step comprising intimately mixing a liquid composite comprising 3-(p-chlorophenyl)-1,1-dimethylurea and a mono-hydroxy substituted aromatic compound having a melting point of below about 100° C., in proportions to give a dry product, with a granular absorbent carrier having a particle size of about 0.5 to 5 millimeters, the temperature of mixing being about 60 to 100° C., the hydroxy substituent of said mono-hydroxy aromatic compound being attached directly to the aromatic nucleus.

6. In a process for preparing free-flowing herbicidal compositions containing 3-(p-chlorophenyl)-1,1-dimethylurea as the essential active ingredient and a solid absorbent carrier, the step comprising intimately mixing a liquid composite comprising 3-(p-chlorophenyl)-1,1-dimethylurea and phenol, in proportions to give a dry product, with a granular absorbent carrier having a particle size of about 0.5 to 5 millimeters, the temperature of mixing being about 60 to 100° C.

7. In a process for preparing free-flowing herbicidal compositions containing 3-(p-chlorophenyl)-1,1-dimethylurea as the essential active ingredient and a solid absorbent carrier, the step comprising intimately mixing a liquid composite comprising 3-(p-chlorophenyl)-1,1-dimethylurea and a cresol, in proportions to give a dry product, with a granular absorbent carrier having a particle size of about 0.5 to 5 millimeters, the temperature of mixing being about 60 to 100° C.

8. In a process for preparing free-flowing herbicidal compositions containing 3-(p-chlorophenyl)-1,1-dimethylurea as the essential active ingredient and a solid absorbent carrier, the step comprising intimately mixing a liquid composite comprising 3-(p-chlorophenyl)-1,1-dimethylurea and a mono-chlorophenol, in proportions to give a dry product with a granular absorbent carrier having a particle size of about 0.5 to 5 millimeters, the temperature of mixing being about 60 to 100° C.

9. In a process for preparing free-flowing herbicidal compositions containing 3-(p-chlorophenyl)-1,1-dimethylurea as the essential active ingredient and a solid absorbent carrier, the step comprising intimately mixing a liquid composite comprising 3-(p-chlorophenyl)-1,1-dimethylurea and cresylic acid, in proportions to give a dry product with volcanic sand having a particle size of about 0.5 to 5 millimeters, the temperature of mixing being about 60 to 100° C.

10. A herbicidal composition comprising the dry product prepared in accordance with claim 1.

11. A herbicidal composition comprising the dry product prepared in accordance with claim 2.

12. A herbicidal composition comprising the dry product prepared in accordance with claim 3.

13. A herbicidal composition comprising the dry product prepared in accordance with claim 4.

14. A herbicidal composition comprising the dry product prepared in accordance with claim 5.

15. A herbicidal composition comprising the dry product prepared in accordance with claim 6.

16. A herbicidal composition comprising the dry product prepared in accordance with claim 7.

17. A herbicidal composition comprising the dry product prepared in accordance with claim 8.

18. A herbicidal composition comprising the dry product prepared in accordance with claim 9.

References Cited in the file of this patent
UNITED STATES PATENTS

| | | |
|---|---|---|
| 2,229,948 | Weil | Jan. 28, 1941 |
| 2,655,445 | Todd | Oct. 13, 1953 |